United States Patent
Uchida et al.

(10) Patent No.: US 8,705,570 B2
(45) Date of Patent: Apr. 22, 2014

(54) COMMUNICATION DEVICE AND COMMUNICATION METHOD

(75) Inventors: Tetsuya Uchida, Kawasaki (JP); Takashi Kuwabara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 12/970,609

(22) Filed: Dec. 16, 2010

(65) Prior Publication Data

US 2011/0150468 A1   Jun. 23, 2011

(30) Foreign Application Priority Data

Dec. 18, 2009   (JP) ................................ 2009-287550

(51) Int. Cl.
- *H04L 12/28* (2006.01)
- *H04J 3/16* (2006.01)
- *H04J 3/00* (2006.01)
- *H04J 14/00* (2006.01)
- *H04B 10/00* (2013.01)

(52) U.S. Cl.
USPC ...... 370/473; 370/393; 370/395.51; 370/471; 370/476

(58) Field of Classification Search
USPC ................. 370/389, 392–393, 395.5–395.51, 370/466–467, 470–471, 473–474, 476
See application file for complete search history.

(56) References Cited

U.S. PATENT DOCUMENTS

| 6,697,386 | B2 | 2/2004 | Sugawara et al. |
| 2005/0286521 | A1* | 12/2005 | Chiang et al. ................. 370/389 |
| 2006/0104309 | A1* | 5/2006 | Vissers et al. ................. 370/474 |
| 2007/0071443 | A1 | 3/2007 | Fukumitsu et al. |
| 2007/0104485 | A1* | 5/2007 | Zhang .............................. 398/69 |
| 2007/0189336 | A1* | 8/2007 | Zou ................................ 370/505 |
| 2007/0248121 | A1* | 10/2007 | Zou ................................ 370/498 |
| 2009/0162061 | A1* | 6/2009 | Kisaka et al. ................... 398/52 |

FOREIGN PATENT DOCUMENTS

| JP | 6-112917 A | 4/1994 |
| JP | 9-321729 A | 12/1997 |
| JP | 2004-266480 A | 9/2004 |
| JP | 2005-184513 | 7/2005 |
| JP | 2007-96822 A | 4/2007 |
| JP | 2007-174322 A | 7/2007 |

OTHER PUBLICATIONS

Japanese Office Action mailed Apr. 9, 2013 for corresponding Japanese Application No. 2009-287550, with Partial English-language Translation.

* cited by examiner

*Primary Examiner* — Redentor Pasia
(74) *Attorney, Agent, or Firm* — Fujitsu Patent Center

(57) ABSTRACT

A communication device includes a control signal generating unit to generate a control signal for each of a plurality of second frames, and a mapping unit to map a payload signal of the plurality of second frames in a payload area of a first frame, and map at least some of the control signals generated by the control signal generating unit in a control signal area of the first frame.

5 Claims, 17 Drawing Sheets

FIG. 6

| COLUMN<br>ROW | 15 | 16 | |
|---|---|---|---|
| 1 | VCOH 1 | JC 1 | |
| 2 | VCOH 2 | JC 2 | |
| 3 | VCOH 3 | JC 3 | |
| 4 | PSI | NJO | PJO |

FIG. 8

| STAT | MEANING |
|---|---|
| 000 | RESERVED |
| 001 | NORMAL PATH SIGNAL |
| 010 | RESERVED |
| 011 | RESERVED |
| 100 | RESERVED |
| 101 | MAINTENANCE SIGNAL: SUB ODU1-LCK |
| 110 | MAINTENANCE SIGNAL: SUB ODU1-OCI |
| 111 | MAINTENANCE SIGNAL: SUB ODU1-AIS |

FIG. 9

| | VCOH 1 | VCOH 2 | CRC8 |
|---|---|---|---|
| 0 | MFI 1 | $MST_{0-7}$ | CRC8 |
| 1 | MFI 2 | $MST_{8-15}$ | CRC8 |
| 2 | RESERVED | $MST_{16-23}$ | CRC8 |
| 3 | RESERVED | $MST_{24-31}$ | CRC8 |
| 4 | SQ | $MST_{32-39}$ | CRC8 |
| 5 | CTRL \| *1 \| *2 \| *3 | $MST_{40-47}$ | CRC8 |
| 6 | RESERVED | $MST_{48-55}$ | CRC8 |
| ⋮ | ⋮ | ⋮ | ⋮ |
| 15 | RESERVED | $MST_{120-127}$ | CRC8 |

×16 TS

TIME →

*1: GID
*2: RSA
*3: RESERVED

FIG. 11

| PAYLOAD TYPE | HEX | MEANING |
|---|---|---|
| 0000 0001 | 01 | EXPERIMENTAL MAPPING |
| 0000 0010 | 02 | ASYNCHRONOUS CBR MAPPING |
| 0000 0011 | 03 | BIT SYNCHRONOUS CBR MAPPING |
| 0000 0100 | 04 | ATM MAPPING |
| 0000 0101 | 05 | GFP MAPPING |
| 0001 0000 | 10 | BIT STREAM WITH OCTET TIMING MAPPING |
| 0001 0001 | 11 | BIT STREAM WITHOUT OCTET TIMING MAPPING |
| 0101 0101 | 55 | NOT AVAILABLE |
| 0110 0110 | 66 | NOT AVAILABLE |
| 1000 xxxx | 80-8F | RESERVED |
| 1111 1101 | FD | NULL TEST SIGNAL MAPPING |
| 1111 1110 | FE | PRBS TEST SIGNAL MAPPING |
| 1111 1111 | FF | NOT AVAILABLE |

FIG. 16

| FRAME NO. | 0 | 1 | ... | 15 | 16 | 17 | ... | 255 | 256 | 257 | ... | 1023 | 1024 |
|---|---|---|---|---|---|---|---|---|---|---|---|---|---|
| TTI (1024) | SAPI[0] TS#1 | SAPI[0] TS#2 | | SAPI[0] TS#16 | SAPI[1] TS#1 | SAPI[1] TS#2 | | SAPI[15] TS#16 | DAPI[0] TS#1 | DAPI[0] TS#2 | | TEXT[31] TS#16 | SAPI[0] TS#1 |
| BIP4 (16) | TS#1 | TS#2 | | TS#16 | TS#1 | TS#2 | | TS#16 | TS#1 | TS#2 | | TS#16 | TS#1 |
| STAT (16) | TS#1 | TS#2 | | TS#16 | TS#1 | TS#2 | | TS#16 | TS#1 | TS#2 | | TS#16 | TS#1 |
| VCOH (256) | [0] TS#1 | [0] TS#2 | | [0] TS#16 | [1] TS#1 | [1] TS#2 | | [15] TS#16 | [0] TS#1 | [0] TS#2 | | [15] TS#16 | [0] TS#1 |
| PSI (256) | PT | VcPT | | MSI TS#14 | MSI TS#15 | MSI TS#16 | | RESERVED | PT | VcPT | | RESERVED | PT |
| BDI (16) | TS#1 | TS#2 | | TS#16 | TS#1 | TS#2 | | TS#16 | TS#1 | TS#2 | | TS#16 | TS#1 |
| BEI (16) | TS#1 | TS#2 | | TS#16 | TS#1 | TS#2 | | TS#16 | TS#1 | TS#2 | | TS#16 | TS#1 |

COMMUNICATION DEVICE AND COMMUNICATION METHOD

CROSS-REFERENCE TO RELATED APPLICATIONS

This application is based upon and claims the benefit of priority from the prior Japanese Patent Application No. 2009-287550 filed on Dec. 18, 2009, the entire contents of which are incorporated herein by reference.

FIELD

The embodiments discussed herein are related to a communication device and a communication method and are applicable to, for example, an optical transmission network.

BACKGROUND

In a communication network, especially a core network, high-speed and wideband communication has been developed. In many cases, an optical transmission network is used as a core network. For example, there is an Optical Transport Network (OTN), which is recommended by International Telecommunication Union (ITU), as a transmission specification of the optical transmission network. The OTN is given as an example to describe a frame that is transmitted and received on the communication network.

In the OTN, an overhead byte as a control signal is added to a signal, which flows into the optical transmission network, and is then transmitted as an OTN frame. The OTN frame includes an overhead of an Optical channel Payload Unit (OPU), and an overhead of an Optical channel Data Unit (ODU) in addition to a payload that stores a client signal. The overhead byte may be used to report a transmission quality and a state of the client signal to and from optical transmission devices.

The client signal may flow into the optical transmission network from various types of communication devices such as a packet communication device and a Synchronous Optical NETwork (SONET) device. In the OTN, various types of OTN frames are defined to store various types of client signals having different transmission rates. For example, a frame called an Optical channel Transport Unit (OTU) 1 may store a client signal of up to approximately 2.5 Gbps. An OTU 3 may store a client signal of up to approximately 40 Gbps. An OTU 4 may store a client signal of up to approximately 100 Gbps. As described above, the capacity of the OTN frame has been increased.

Regarding the communication system that performs communication in an ODU form specified by ITU G.709, Japanese Laid-open Patent Publication No. 2004-266480 discloses a technique for converting a signal form by adding a byte for control that includes a specific pattern to an original signal at a transmission side and for restoring an original signal at a reception side.

SUMMARY

According to an aspect of the invention, a communication device includes a control signal generating unit to generate a control signal for each of a plurality of second frames, and a mapping unit to map a payload signal of the plurality of second frames in a payload area of a first frame, and map at least some of the control signals generated by the control signal generating unit in a control signal area of the first frame.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 6 is a diagram illustrating a configuration example of an OPU overhead;

FIG. 8 is a diagram illustrating an allocation example of an STAT in the JC byte;

FIG. 9 is a diagram illustrating a configuration example of a VCOH byte in the OPU overhead;

FIG. 11 is a diagram illustrating an allocation example of a payload type in the PSI byte;

FIG. 16 is a diagram illustrating a transmission timing of a control bit.

DETAILED DESCRIPTION OF THE PREFERRED EMBODIMENTS

In an optical transmission system, even though the frame capacity has been increased as described above, a client signal having a low rate may be flown in to the optical transmission system. For example, while an OTU1 as a minimum frame in a conventional OTN may store a client signal of approximately 2.5 Gbps, a client signal such as Optical Carrier-3 (OC-3) of approximately 150 Mbps or OC-12 of approximately 600 Mbps may flow from the SONET device. If the above-described client signal is stored in the OTU1, a transmission efficiency is decreased.

To solve the above-described problem, a frame called a Sub ODU1 is proposed as a type of the OTN frame. The Sub ODU1 is suitable to store a client signal having a rate that is lower than the rate of the OTU1. A plurality of Sub ODU1s is collected and stored in the OTU1. That is, the plurality of Sub ODU1s is mapped in one OTU1 and is then transmitted. This may improve the transmission efficiency of the OTU1.

Regarding the Sub ODU1, however, how a corresponding overhead byte is transmitted between the optical transmission devices becomes a problem. That is, the overhead byte added to the OTU1 corresponds to the whole OTU1 and does not correspond to each of the Sub ODU1s. Therefore, the transmission quality and the state of each of the client signals may not be easily detected at a reception side simply by the overhead byte of the OTU1. If the optical transmission device of the reception side detects the transmission quality and the state of each of the client signals by directly monitoring the client signal, signal processing by the optical transmission device becomes complex.

On the other hand, there is a method for mapping the Sub ODU1 added with the overhead in the payload of the OTU1. However, according to a relation between the maximum transmission rate of a signal that may be stored in a payload of the OTU1 and the transmission rate of a plurality of client signals, the plurality of Sub ODU1s added with the overhead byte may not be stored in the payload of the OTU1. That is, there may be no space to directly add an overhead byte in each of the plurality of Sub ODU1s when the plurality of Sub ODU1s is stored in the payload of the OTU1.

The above-described problem may occur in a communication network (even a network that is not an optical transmission network) based on a specification other than the OTN even though the OTN is given as an example to describe the problem that occurs when a plurality of frames is stored in one frame and is then transmitted.

Figure 1:
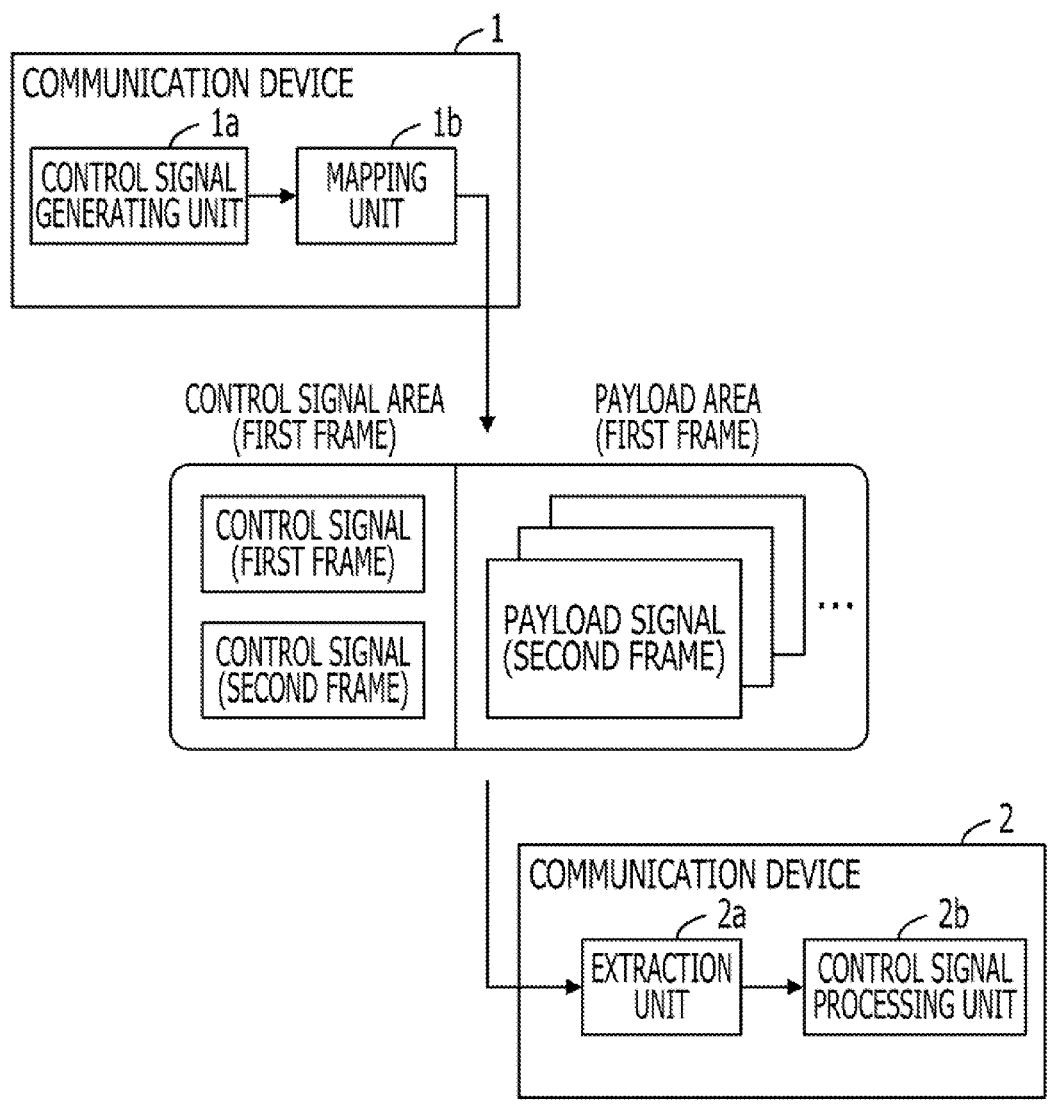
FIG. 1 is a diagram illustrating a communication system according to an embodiment.

Embodiments will be described below with reference to the diagrams. FIG. 1 is a diagram illustrating a communication system according to an embodiment. The communication system according to the embodiment includes communication devices 1 and 2. The communication system may be achieved as, for example, an optical transmission network. The communication devices 1 and 2 may be achieved as, for example, optical transmission devices. The communication devices 1 and 2 transmit and receive a first frame that stores a plurality of second frames. For example, the OTU1 of the OTN as the first frame (or first type of frame) may be used, and the Sub ODU1 of the OTN as the second frame (or second type of frame) may be used.

The communication device 1 transmits the first frame to the communication device 2. The communication device 1 includes a control signal generating unit 1a and a mapping unit 1b. The control signal generating unit 1a generates a control signal of each of the plurality of second frames. The generated control signal may include various types of control signals. Moreover, the generated control signal may include control signals of various control layers. For example, the generated control signal may include what is equivalent to an OPU overhead byte and what is equivalent to an ODU overhead byte.

The mapping unit 1b multiplexes and maps a payload signal (for example, a client signal of the OTN) of the plurality of second frames in a payload area of the first frame. Moreover, the mapping unit 1b maps at least some of the control signals generated by the control signal generating unit 1a in a control signal area of the first frame.

That is, the control signal area of the first frame may include the control signal of the first frame and the control signal of the second frame. For example, the mapping unit 1b may map the control signal of the second frame in an area (an empty area), which is not used to transmit the control signal of the first frame, in the control signal area. For example, an overhead of the OTN (especially, an OPU overhead) may be used as the control signal area.

In this case, the control signals of the plurality of second frames may be distributed to a plurality of first frames. For example, a control signal of a first one of the second frames may be mapped in the first one of the first frames, and a control signal of a second one of the second frames may be mapped in the second one of the first frames. According to a type of the control signal, the number of the first frames to be used is variable. For example, the control signals of the plurality of second frames are distributed and mapped in 16 first frames regarding a certain type of control signal, and the control signals of the plurality of second frames are distributed and mapped in 256 first frames regarding other types of control signal.

The communication device 2 receives the first frame from the communication device 1. The communication device 2 includes an extraction unit 2a and a control signal processing unit 2b. The extraction unit 2a extracts the payload signal of the plurality of second frames multiplexed in the payload area of the first frame. Moreover, the extraction unit 2a extracts the control signal of the plurality of second frames included in the control signal area of the first frame. Based on the control signal extracted by the extraction unit 2a, the control signal processing unit 2b performs communication control on each of the plurality of second frames. For example, the control signal processing unit 2b performs processing such as measurement of the transmission quality.

In the above-described communication system according to the first embodiment, the control signal generating unit 1a of the communication device 1 generates a control signal of each of the plurality of second frames. The mapping unit 1b multiplexes and maps the payload signal of the plurality of second frames in the payload area of the first frame, and maps at least some of the control signals of the second frame generated by the control signal generating unit 1a in the control signal area of the first frame.

The extraction unit 2a of the communication device 2 extracts the payload signal of the plurality of second frames multiplexed in the payload area of the first frame, and extracts the control signal of the plurality of second frames included in the control signal area of the first frame. Based on the extracted control signal, the control signal processing unit 2b performs communication control on each of the plurality of second frames.

Consequently, the frame that stores a plurality of frames may be efficiently transmitted. That is, the communication device 2 and a communication device (not illustrated) as an intermediate node located between the communication device 1 and the communication device 2 may detect the state of the second frame and the transmission quality without directly monitoring the payload signal of the second frame. As a result, complexity of the frame processing is reduced, so that a circuit configuration of the communication device may be simplified.

Since at least some of the control signals of the second frame are mapped in the control signal area of the first frame that stores the second frames, a band of the payload area of the first frame may be efficiently used. For example, if the overhead byte for the Sub ODU1 is not included in the payload (approximately 2.5 Gbps) of the OTU1, 16 Sub ODU1s that store OC-3 (approximately 150 Mbps) may be multiplexed and stored in the payload.

If the control signals of the plurality of second frames are distributed to the plurality of first frames and mapped, the above-described mapping may be achieved by using the empty space in the control signal area of the first frame. At that time, since the number of the first frames to be mapped is variable, the control signal may be transmitted at an appropriate frame frequency according to a type of the control signal. For example, the frequency of appearance of one type of control signal is increased, and the frequency of appearance of other types of the control signal is decreased. This makes it possible to appropriately perform control of a certain type of the second frame while the area for transmission of the control signal of another certain type of the second frame is reduced.

In the example of the communication system illustrated in FIG. 1, the communication device 1 has a transmission function of a frame, and the communication device 2 has a reception function of a frame. One communication device may have both the transmission function and the reception function. Moreover, the communication system according to the first embodiment may be achieved as a communication network (even a network that is not an optical transmission network) based on a specification other than the OTN. In the other embodiments described below, a transmitting method of an overhead byte will be further described in detail on assumption of the OTN.

Figure 2:
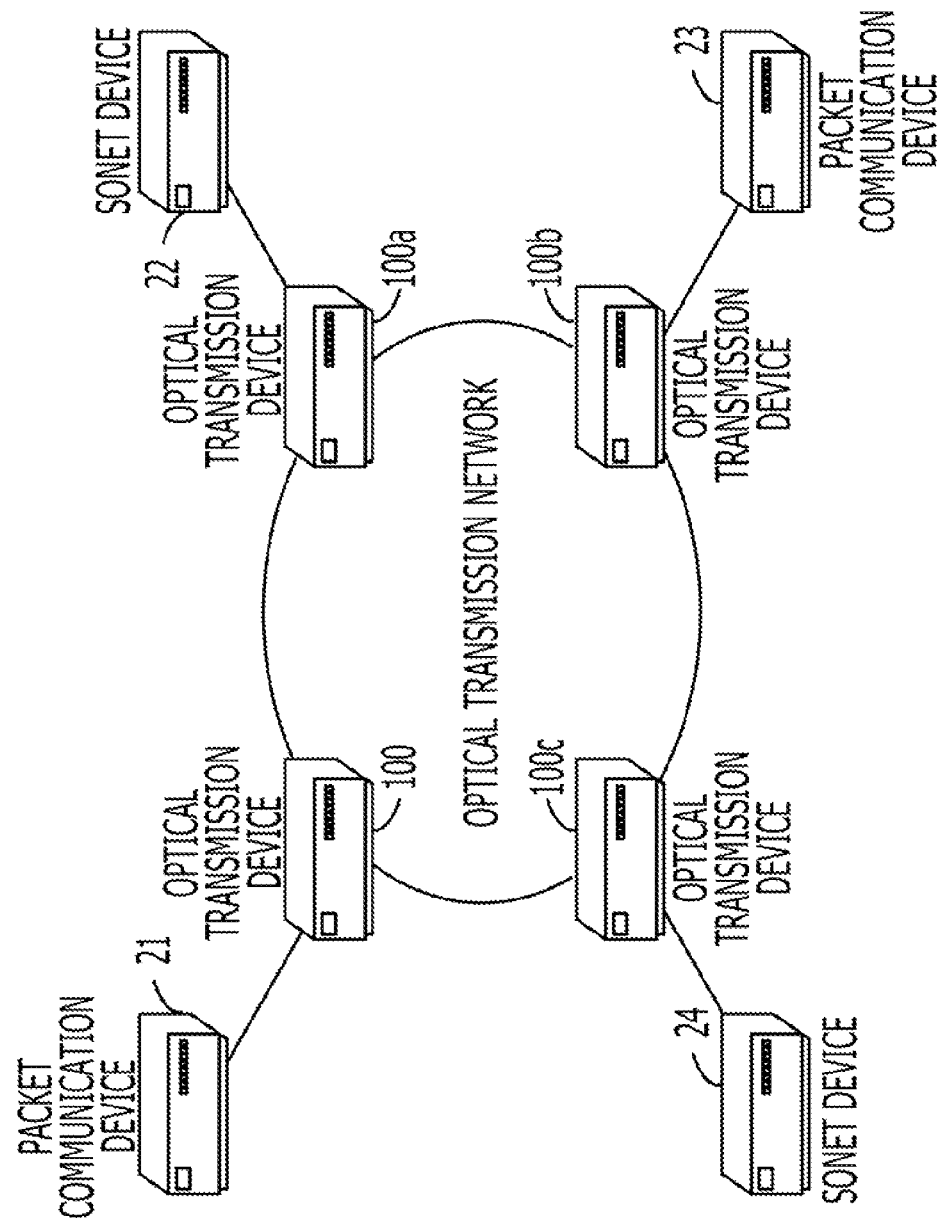
FIG. 2 is a diagram illustrating the communication system according to another embodiment.

FIG. 2 is a diagram illustrating a communication system according to another embodiment. The communication system according to the present embodiment includes optical transmission devices 100, 100a, 100b, and 100c, packet communication devices 21 and 23, and SONET devices 22 and 24.

The optical transmission devices 100, 100a, 100b, and 100c are provided as nodes of the optical transmission network, and frame transmission based on the specification of the OTN is performed between the optical transmission devices 100, 100a, 100b, and 100c. The optical transmission devices 100, 100a, 100b, and 100c are coupled to a communication device outside the optical transmission network. Specifically, the optical transmission device 100 is coupled to the packet communication device 21, the optical transmission device 100a is coupled to the SONET device 22, the optical transmission device 100b is coupled to the packet communication device 23, and the optical transmission device 100c is coupled to the SONET device 24.

The optical transmission devices 100, 100a, 100b, and 100c store the signal (the client signal), which flows from the communication device outside the optical transmission network, in the OTN frame and transfers the OTN frame to another optical transmission device. The optical transmission devices 100, 100a, 100b, and 100c extract the client signal from the OTN frame received from the other optical transmission device and transfer the client signal to the communication device outside the optical transmission network. Moreover, the optical transmission devices 100, 100a, 100b, and 100c perform the communication control on the client signal by using the overhead byte included in the OTN frame.

Figure 3:
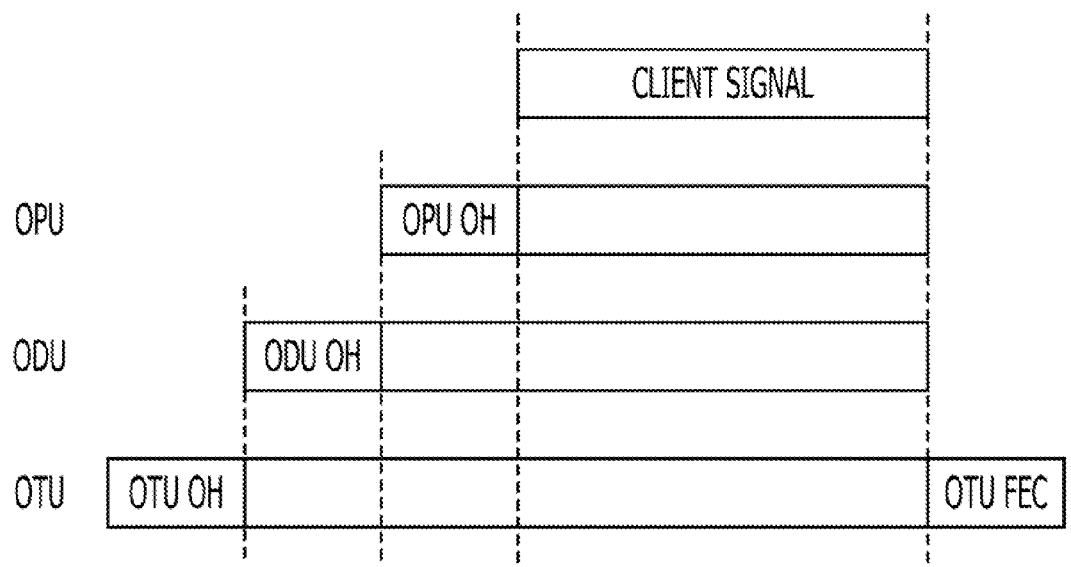
FIG. 3 is a diagram illustrating a frame layer.

FIG. 3 is a diagram illustrating a frame layer. The OTN frame has a layer structure illustrated in FIG. 3. The OPU includes a payload, which stores a client signal, and an OPU overhead. The ODU is added with the ODU overhead at the head part of the OPU. The OTU is added with the OTU overhead at the head part of the ODU and is added with an OTU Forward Error Correction (FEC) code at the end part of the ODU.

The OPU overhead includes information for adapting the client signal to the OPU. The ODU overhead includes information used for maintenance or operation of an optical channel. The OTU overhead includes information used for operation of frame transmission through one or more optical channel connections. The OTU FEC is used by the optical transmission device that receives the OTN frame to perform error correction. The OTU FEC is used to control retransmission of the OTN frame and to improve the transmission efficiency.

There are various types of OPU, ODU, and OTU according to the maximum rate of the client signal that may be stored. The OPU and the ODU that correspond to the above-described OTU1 are called an OPU1 and an ODU1.

Figure 4:
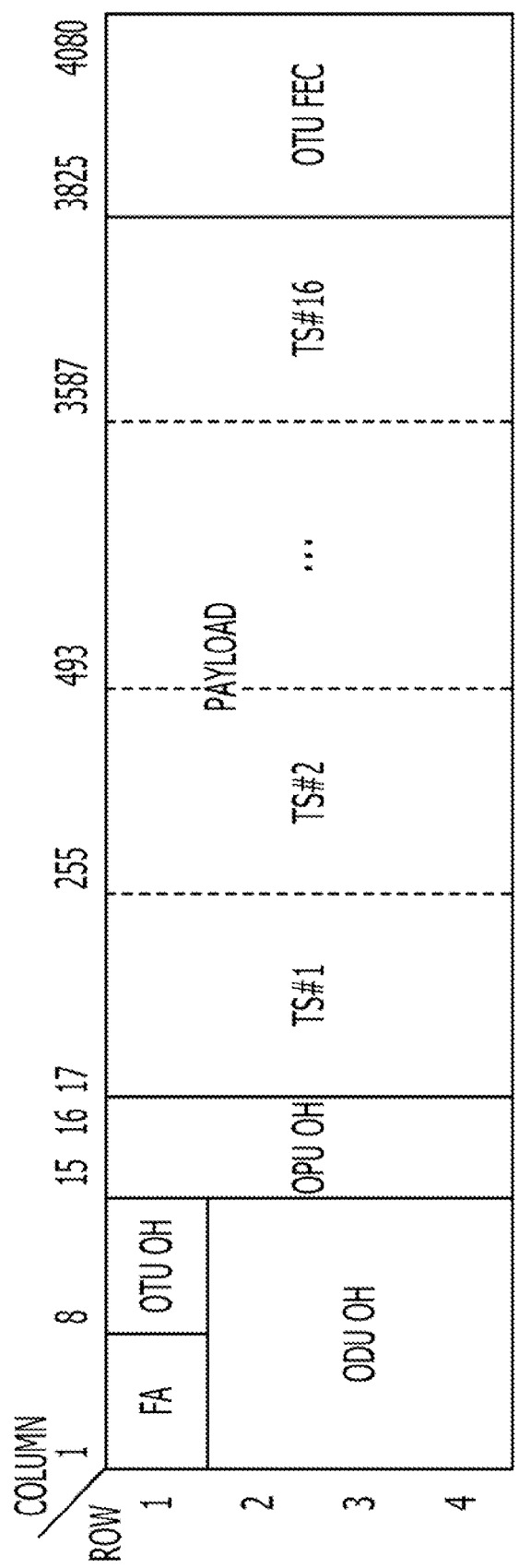
FIG. 4 is a diagram illustrating a configuration example of a frame.

FIG. 4 is a diagram illustrating a configuration example of a frame. In FIG. 4, the OTN frame is expressed by a block in a matrix form of 4 rows by 4080 columns. One block specified by 1 row by 1 column is equivalent to 1 byte. When the OTN frame is transmitted, the bytes of 1st, 2nd, 3rd, etc. 4080th columns of the first row are transmitted in order. After that, the bytes from the 1st column to the 4080th column of the 2nd row are transmitted in order. Similarly, the bytes in the 3rd row and the 4th row are transmitted in order. Each of the bytes is expressed in Big Endian. A Most Significant Bit (MSB) is transmitted first and a Least Significant Bit (LSB) is transmitted last.

The OTN frame includes a Frame Alignment (FA), an OTU overhead, an ODU overhead, an OPU overhead, a payload, and an OTU FEC. The FA is referred to identify the frame and includes a Multi Frame Alignment Signal (MFAS) as a number circulating in a 256-frame cycle.

Seven bytes of the 1st row, the 1st to 7th columns are allocated to the FA. Seven bytes of the 1st row, the 8th to 14th columns are allocated to the OTU overhead. Three by 14 bytes of the 2nd to 4th rows, the 1st to 14th columns are allocated to the ODU overhead. Four by 2 bytes of the 15th to 16th columns are allocated to the OPU overhead. Four by 3808 bytes of the 17th to 3824th columns are allocated to the payload. Four by 256 bytes of the 3825th to 4080th columns are allocated to the OUT FEC.

The payload is divided into 16 Tributary Slots (TS#1 to #16). Four by 238 bytes are allocated to each of the TSs. For example, the 17th to 254th columns are allocated to the TS#1, the 255th to 492nd columns are allocated to the TS#2, and the 3587th to 3824th columns are allocated to the TS#16.

Figure 5:
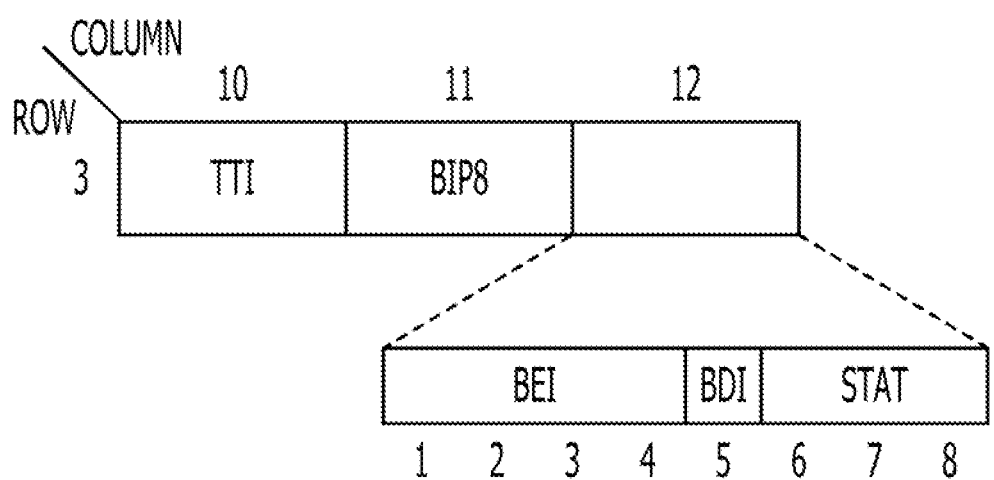
FIG. 5 is a diagram illustrating a configuration example of a PM byte in an ODU overhead.

FIG. 5 is a diagram illustrating a configuration example of a Path Monitoring (PM) byte in the ODU overhead. The PM byte illustrated in FIG. 5 is information for managing a transmission path of the ODU and is allocated to the 3rd row, the 10th to 12th columns in the ODU overhead.

A Trail Trace identifier (TTI) is set in the 3rd row, the 10th column. A Bit Interleaved Party (BIP) 8 is set in the 3rd row, the 11th column. A Backward Error Indication (BEI) of 4 bits, a Backward Defect Indication (BDI) of 1 bit, and a STATus bit (STAT) of 3 bits are set in the 3rd row, the 12th column.

The TTI is character string information to be reported to a manager's terminal. The BIP 8 is a parity of 8 bits used to detect an error of a main signal. The BEI indicates information for reporting an error state of the main signal to the transmission side (an upward direction) from the reception side of the main signal. The BDI is information for reporting an occurrence of a line fault to the upward direction. The STAT indicates information indicating a state of a client signal. The PM byte illustrated in FIG. 5 is an overhead byte for the whole ODU and is different from the overhead byte for each of the Sub ODU1s described below.

FIG. 6 is a diagram illustrating a configuration example of an OPU overhead. A Virtual Concatenation OverHead (VCOH) is set in the 1st to 3rd rows, the 15th column. A Justification Control (JC) is set in the 1st to 3rd rows, the 16th column. A Payload Structure Identifier (PSI) is set in the 4th row, the 15th column. A Negative Justification Opportunity (NJO) is set in the 4th row, the 16th column. A Positive Justification Opportunity (PJO) is set in the payload of the 4th row.

The VCOH indicates information indicating that a plurality of TSs is bundled to be used as a Sub ODU1 (Virtual Concatenation: VCAT). The NJO and the PJO indicate information indicating a storage state of a stuff bit. The PSI indicates information related to a configuration of the payload. The NJO and the PJO are signals that absorb a difference (a frequency difference) of a transmission rate between the client signal and the payload. If the transmission rate of the client signal is higher than the transmission rate of the payload, the client signal is stored in the NJO and the PJO. If the transmission rate of the client signal is substantially equal to the transmission rate of the payload, the stuff bit is inserted into the NJO and the client signal is stored in the PJO. If the transmission rate of the payload is higher than the transmission rate of the client signal, the stuff bit is inserted into the NJO and the PJO.

In addition to the information related to the whole OPU1, the information related to each of the Sub ODU1s is mapped in the OPU1 overhead. The overhead byte to be mapped in the OPU1 overhead will be described below in detail.

Figure 7:
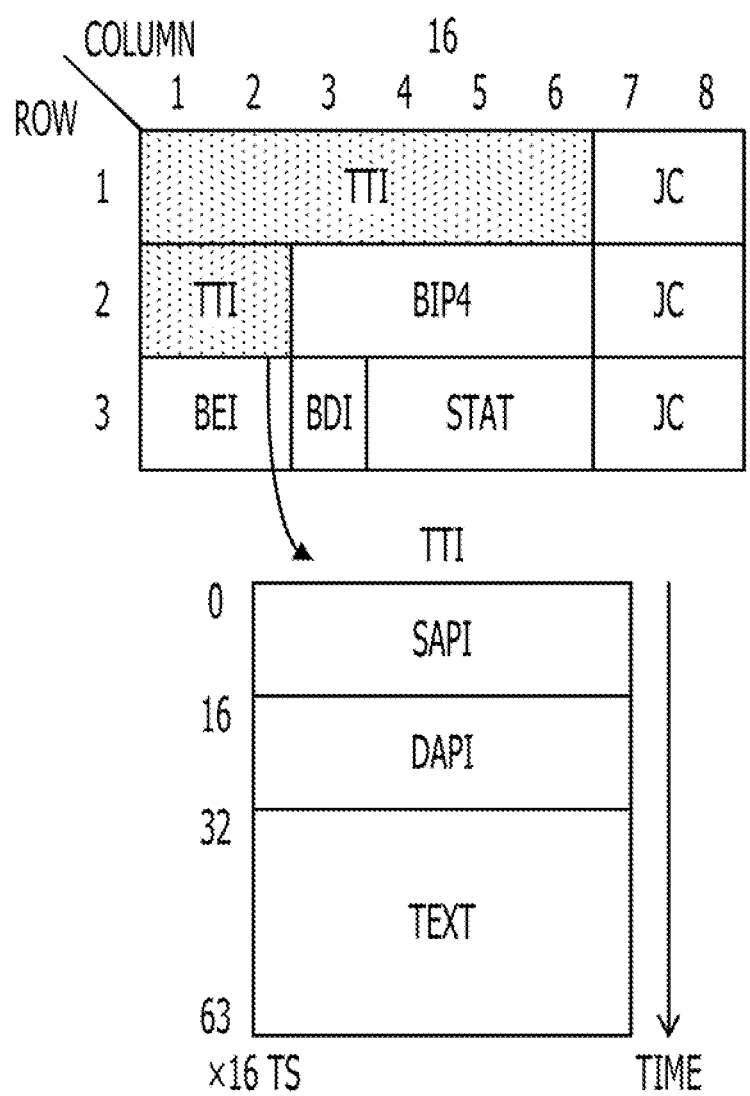
FIG. 7 is a diagram illustrating a configuration example of a JC byte in the OPU overhead.

FIG. 7 is a diagram illustrating a configuration example of a JC byte in the OPU overhead. FIG. 7 illustrates details of the 1st to 3rd rows, the 16th column in the OPU1 overhead. The TTI of 1 bit is set in the 1st row, the 1st to 6th bits, and the 2nd row, the 1st to 2nd bits. The BIP4 of 4 bits is set in the 2nd row, the 3rd to 6th bits. The BEI of 2 bits is set in the 3rd row, the 1st to 2nd bits. The BDI of 1 bit is set in the 3rd row, the 3rd bit. The STAT of 3 bits is set in the 3rd row, the 4th to 6th bits. Three of JC bits of 2 bits are set in the 1st to 3rd rows, the 7th to 8th bits.

The TTI will be described below. As described above, the TTI is character string information to be reported to a manager's terminal. In this case, the TTI to be mapped in the OPU1 overhead is a TTI of the Sub ODU1. A transmission side node (a communication device or an optical transmission device) transmits a character string (a text), which is set to the node by the manager's terminal, as the TTI. A reception side node (a communication device or an optical transmission device) reports the text included in the received TTI to the manager's terminal that corresponds to the reception side node.

Information of 64 bytes for each of the TSs is transmitted as the TTI. Specifically, the TTI includes a Source Access Point Identifier (SAPI) of 16 bytes (TTI [0] to [15]), a Destination Access Point Identifier (DAPI) of 16 bytes (TTI [16] to [31]), a text of 32 bits (TTI [32] to [63]), and other information. The SAPI is information for identifying a transmission source node. The DAPI is information for identifying a destination node.

The TTI of 16 TSs, that is, information of 16×64=1024 bytes is transmitted by using the OPU1 overhead. On the other hand, regarding the OPU1 overhead, 1 byte is allocated to the TTI per frame. Accordingly, the TTI of the TS#1 to #16 is transmitted in a 1024-frame cycle. That is, the TTI is transmitted by multi-framing the 1024 frame. Generally, the text included in the TTI is not the information that is updated in a short time, and the text included in the TTI is not the information that desires a high response speed. Consequently, an adverse effect to communication control is considered to be small even if the text is transmitted in the 1024-frame cycle.

The BIP4 will be described below. The BIP4 is a parity of 4 bits used to detect an error of the main signal. The BIP 4 to be mapped in the OPU1 overhead is a parity of the Sub ODU1. The transmission side node uses a prescribed formula with respect to the main signal to calculate and transmit a parity as the BIP4. The reception side node applies the formula similar to the formula used by the reception transmission side node with respect to the received main signal to calculate the value. The reception side node detects an error of the received main signal by comparing the value to the BIP4. This enables the reception side node to detect the transmission quality of the main signal.

The BIP4 for 16 TSs, that is, the parity of 16×4 bits is transmitted by using the OPU1 overhead. On the other hand, regarding the OPU1 overhead, 4 bits are allocated to the BIP4 per frame. The BIP4 of the TS#1 to #16 is transmitted in a 16-frame cycle. A range of the main signal used to calculate the BIP4 will be described below.

The BEI will be described below. As described above, the BEI is information for reporting an error state of the main signal from the reception side node to the transmission side node. In this case, the BEI to be mapped in the OPU 1 overhead is a BEI of the Sub ODU1. The reception side node of the main signal encodes a result of the error detection using the BIP4 into 2 bits and reports the result to the node of the transmission source of the main signal. When receiving the BEI, the node reports the error state indicated by the BEI to the manager's terminal.

For example, if the number of error bits is 0 according to the error detection using the BIP4, the node transmits 0b00 (0) (if no error is detected) as the BEI. If the number of error bits is 1, the node transmits 0b01 (1). If the number of error bits is 2, the node transmits 0b10 (2). If the number of error bits is 3, the node transmits 0b11 (3).

The BEI of 16 TSs, that is, the information of 16×2 bits is transmitted by using the OPU1 overhead. On the other hand, regarding the OPU1 overhead, 2 bits are allocated to the BEI per frame. In this case, the BEI of the TS#1 to #16 is transmitted by the 16-frame cycle.

The BDI will be described below. As described above, the BDI is information for reporting an occurrence of a line fault to the transmission side node from the reception side node. The BDI to be mapped in the OPU1 overhead is a BDI of the Sub ODU1. When detecting the line fault, the reception side node of the main signal transmits BDI=1 in an upward direction. In other cases, the reception side node of the main signal transmits BDI=0. Consequently, the occurrence of the line fault is reported to the other node.

The BDI of 16 TSs, that is, the information of 16 bits is transmitted by using the OPU1 overhead. On the other hand, regarding the OPU1 overhead, 1 bit is allocated to the BD1 per frame. In this case, the BDI of the TS #1 to #16 is transmitted in the 16-frame cycle.

Instead of transmitting the BEI and the BDI, the information related to the transmission quality may be transmitted after being bundled into 3 bits and encoded. This makes it possible to report more states by the same number of bits compared to a case where the BEI and the BDI are transmitted separately.

The STAT will be described below. As described above, the STAT is information indicating a state of a client signal. In this case, the STAT to be mapped in the OPU 1 overhead is an STAT of the Sub ODU1. The transmission side node encodes the state of the client signal to be stored in the Sub ODU1 into 3 bits. The reception side node reports the state of the client signal indicated by the STAT to the manager's terminal. A correspondence example of the code of 3 bits and the state of the client signal will be described below.

The STAT of 16 TSs, that is, the information of 16×3 bits is transmitted by using the OPU1 overhead. On the other hand, regarding the OPU1 overhead, 3 bits are allocated to the STAT per frame. Thus, the STAT of the TS#1 to #16 is transmitted in the 16-frame cycle.

On the other hand, the JC bit of 3×2 bits is information of the whole OPU1 payload. Each of the JC bits indicates a use state of a Justification OverHead (JOH), that is, an insertion state of a stuff bit into the NJO byte and the PJ byte. The transmission side node maps the same JC bit of 2 bits in three positions (the 1st, 2nd, and 3rd rows). The reception side node determines the insertion state of the stuff bit by rule of majority of the JC bits in three positions. This is because a bit error may occur in the JC bit during transmission.

FIG. 8 is a diagram illustrating an allocation example of the STAT in the JC byte. As described above, the STAT for the Sub ODU1 is set to the 4th, 5th, and 6th bits of the 3rd row, the 16th column. If the client signal is in a normal state, 0b001 is transmitted as the STAT. If the line is in a maintenance state, 0b101 (Sub ODU1-LCK (Lock)) is transmitted. If a channel is in an unused state, 0b110 (Sub ODU1-OCI (Open Connection Indication)) is transmitted. If a line fault occurs, 0b111 (Sub ODU1-AIS (Alarm Indication Signal)) is transmitted. In this case, 0b000, 0b010, 0b011, and 0b100 are assumed to be in an empty state (a reserved state) for provision of future expansion.

FIG. 9 is a diagram illustrating a configuration example of a VCOH byte in the OPU overhead. Details of the information to be mapped are described in the 1st, 2nd, and 3rd rows, the 15th column in the OPU1 overhead. The information of 16 bytes×3 rows=48 bytes of each of the TSs is transmitted as the VCOH. The VCOH byte is used when the client signal of the transmission rate, which exceeds the transmission rate (approximately 150 Mbps) to be stored in one TS, is stored by a plurality of TSs. The transmission side node transmits the information related to the VCAT as the VCOH. Based on the VCOH, the reception side node restores one client signal from the plurality of Sub ODU1s.

Specifically, the information to be mapped in the 1st row, the 15th column (VCOH3) includes a Multi Frame Identification (MFI) of 2 bytes, a Sequence number (SQ) of 1 byte, a Control word (CTRL) of 4 bits, a Group Identification (GID) of 1 bit, and a Re-Sequence Acknowledge (RSA) of 1 bit. A Member Status Field (MST) is mapped in the 2nd row, the 15th column (VCOH2). A Cyclic Redundancy Check (CRC) 8 is mapped in the 3rd row, the 15th column (VCOH3).

The MFI is a counter value of the number of multi frames and indicates any value from 0 to 65535 by 16 bits. The SQ is information for identifying a sequence of a signal to be mapped in the TS and indicates any value from 0 to 255 by 8 bits. The CTRL is a Link Capacity Adjustment Scheme (LCAS) control command that is specified by G.7042/Y.1305. The GID is information used by the reception side node of a channel to inspect whether the channel is an arrival channel from an assumed node. The RSA is an acknowledge signal (ACK) that is transmitted to the transmission side node from the reception side node.

The MST is information for reporting the state of the client signal stored in the TS and is transmitted to the transmission side node from the reception side node. The CRC8 to be mapped in the VCOH3 is an error detection parity of 8 bits corresponding to the byte mapped in the VCOH1 and the VCOH2. For example, the parity of the VCOH3 [0] is calculated from the byte of the VCOH1 [0] and the VCOH2 [0]. For the description of the details of the above-described information, ITU-T G.7042 is described as well.

The VCOH for 16 TSs, that is, the information of 16×16× 3=256×3 bytes is transmitted by using the OPU1 overhead. On the other hand, 3 bytes are allocated to the VCOH per frame. The VCOH of the TS#1 to #16 is transmitted in the 256-frame cycle.

When the ODU1 is used as a concatenation signal, the VCOH byte is mapped in the OPU 1 overhead. However, if the Sub ODU1 is stored in the ODU1, the OPU1 is may not be used as a concatenation signal. That is, the use of ODU1 overhead and the use of Sub OPU1 overhead are in a mutually exclusive use relation. According to the present embodiment, the VCOH byte in the OPU1 overhead is redefined for the Sub ODU1.

Figure 10:
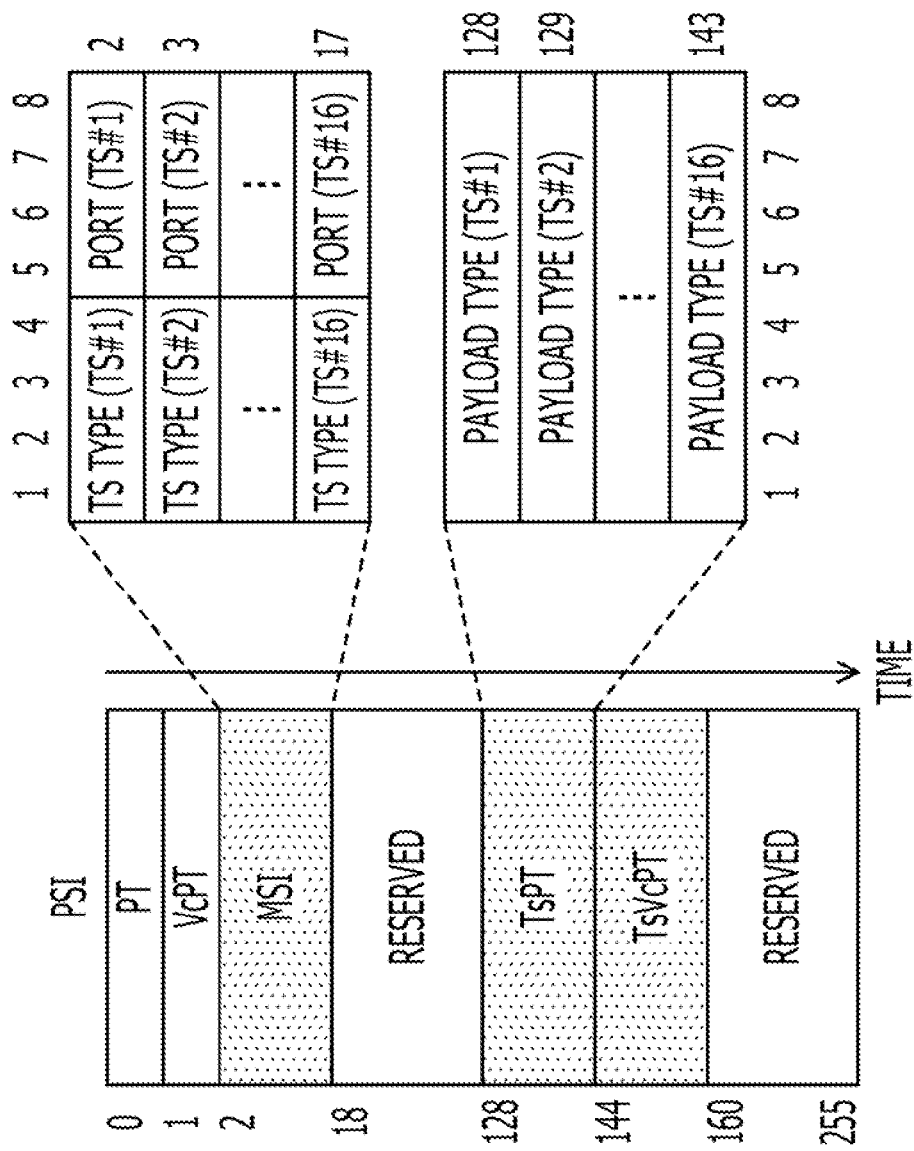
FIG. 10 is a diagram illustrating a configuration example of a PSI byte in the OPU overhead.

FIG. 10 is a diagram illustrating a configuration example of a PSI byte in the OPU overhead. Details of the information to be mapped are described in the 4th row, the 15th column in the OPU1 overhead. The information of 256 bytes is transmitted by using an area of 1 byte provided in the OPU1 overhead. That is, the information illustrated in FIG. 10 is transmitted in a 256 cycle.

The PSI includes a Payload Type (PT) of 1 byte (PSI [0]), a Virtual concatenation Payload Type (VcPT) of 1 byte (PSI [1]), a Multiplex Structure Identifier (MSI) of 16 bytes (PSI [2] to [17]), a Tributary slot Payload Type (TsPT) of 16 bytes (PSI [128] to [143]), and a Tributary slot Virtual concatenation Payload Type (TsVcPT) of 16 bytes (PSI [144] to [159]).

The PT indicates information indicating a type of mapping method of the client signal in the OPU 1 payload. The VcPT indicates information indicating a type of mapping method of the client signal in the OPU1 payload when the VCAT is applied.

The MSI will be described below. The MSI indicates a rate of the Sub ODU1 signal mapped in each of the TSs. The 1st to 16th bytes of the MSI correspond to the TS#1 to #16. The MSI of 1 byte that corresponds to each of the TSs includes a TS byte of 4 bits on an MSB side and a port number of 4 bits on an LSB side. The transmission side node transmits the information indicating a using method of the TS #1 to #16 as the MSI. Based on the TS type and the port number of the MSI, the reception side node restores the client signal.

The TS type is a signal rate expressed by 4 bits. For example, when the signal of 155 Mbps such as an OC-3 signal is transmitted by using one TS, the TS type is 0b0000 (TS1). For example, when a signal of 622 Mpbs such as an OC-12 signal is transmitted by using four TSs, the TS type is 0b0001 (TS4). When a signal of 1.2 Gbps is transmitted by using 8 TSs, the TS type is 0b0010 (TS4-2c). When a signal of 1.8 Gbps is transmitted by using 12 TSs, the TS type is 0b0011 (TS4-3c). Other bit patterns are in the reserved state without being used.

If the TS type is not the TS 1, the port number indicates the TS in the head of the TS group to which the TS itself belongs and is any value from 0 to 15. For example, when 4 TSs from the TS#1 to #4 are used to store the Sub ODU1, the port number of the TS#1 to #4 is 0b0000 (indicating the TS#1). The TS Type is the TS1, an arbitrary value or a prescribed value is set as a port number.

The TsPT and the TsVcPT will be described below. The TsPT indicates a type of the client signal that is mapped in each of the TSs. The 1st to 16th bytes of the TsPT correspond to the TS#1 to #16. The information of the client signal to which the VCAT is applied is not replied as the TsPT. The transmission side node transmits the information of the type of the client signal that is mapped in the Sub ODU1 as the TsPT. Based on the received TsPT, the reception side node restores the client signal.

The TsVcPT indicates a type of the client signal that is mapped in the TS by applying the VCAT. The information about the client signal to which the VCAT is not applied is not replied as the TsVcPT. That is, regarding each of the TSs, either the information of the TsPT or the information of the TsVcPT is selectively transmitted. The transmission side node transmits the information of the type of the client signal, which is mapped in the Sub ODU1 by applying the VCAT, as the TsVcPT. Based on the received TcVcPT, the reception side node restores the client signal.

The MSI, the TsPT, and the TsVcPT are not information that is updated frequently. Consequently, the adverse effect to the communication control is considered to be small even if the information is transmitted in the 256-frame cycle. FIG. 11 is a diagram illustrating an allocation example of a payload type in the PSI byte. The table illustrated in FIG. 11 indicates a relation of a bit string of 8 bits to be transmitted as a payload type, a number indicated by the string in hexadecimal, and a type of the client signal. For example, if the client signal is an asynchronization CBR signal, 0b00000010 (3) is included in the TsPT or the TsVcPT and is then transmitted.

The overhead to be mapped in the OPU1 overhead was described above. An error state (LCK, OCI, or AIS) of the client signal reported by using the STAT may be reported by other methods.

For example, the Sub-ODU1-LCK state may be expressed by setting the byte other than the PSI [0] to [127] in a prescribed pattern (for example, "01010101"). The Sub-ODU1-LCK state may also be reported by the STAT bit.

Moreover, the Sub ODU1-OCI state may be expressed by setting the byte other than the PSI [0] to [127] in a prescribed pattern (for example, "01100110"). Accordingly, the Sub ODU1-OCI state may also be reported by the STAT bit.

Furthermore, the Sub ODU1-OCI state may also be expressed by setting the byte other than the PSI [0] to [127] in a prescribed pattern (for example, "11111111"). Accordingly, the Sub ODU1-AIS state may also be reported by the STAT bit as well.

Figure 12:
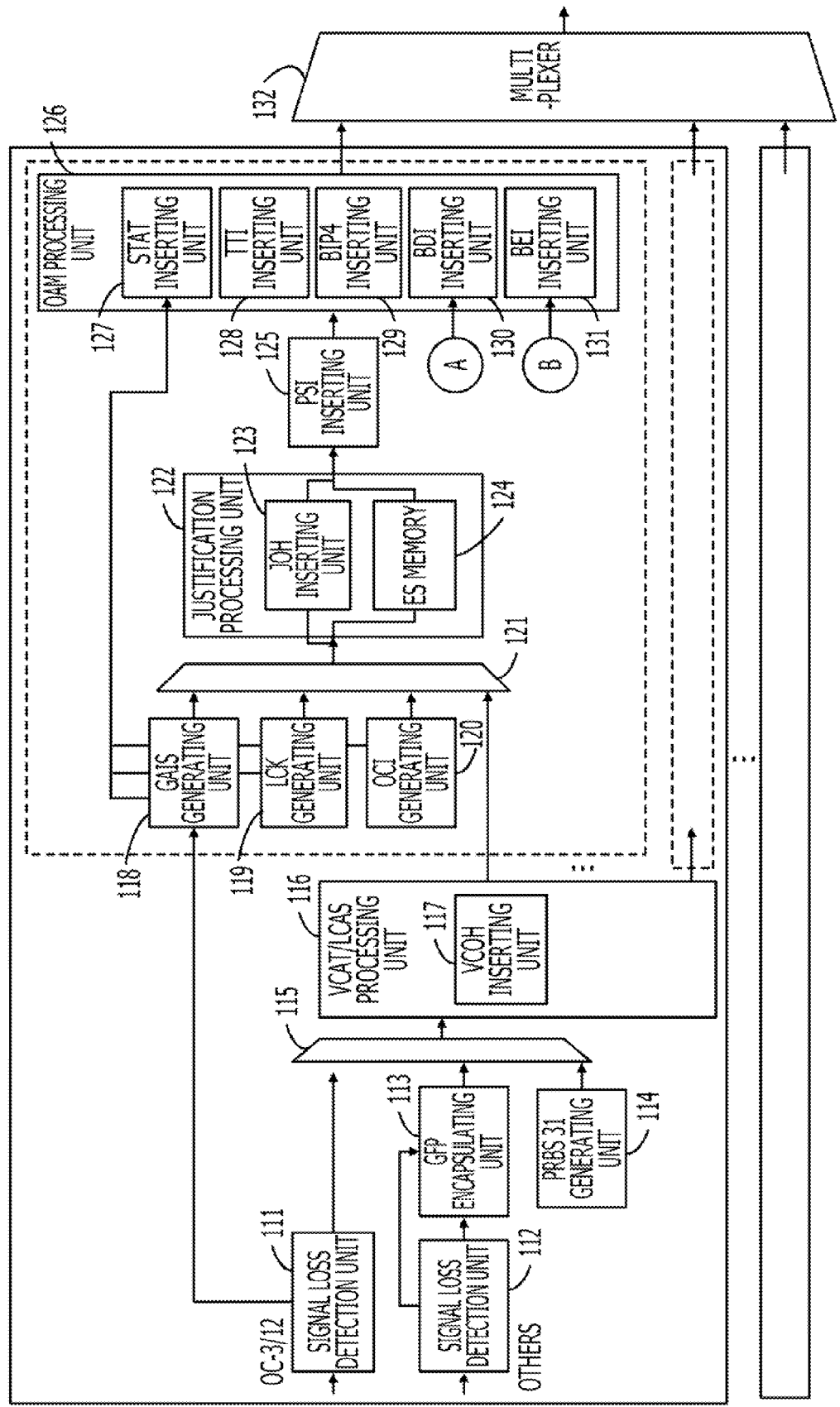
FIG. 12 is a block diagram illustrating a transmission side of an optical transmission device.

FIG. 12 is a block diagram illustrating a transmission side of the optical transmission device. The optical transmission device 100 includes signal loss detection units 111 and 112, a GFP encapsulating unit 113, a PRBS 31 generating unit 114, selectors 115 and 121, a VCAT/LCAS processing unit 116, a gAIS generating unit 118, an LCK generating unit 119, an OCI generating unit 120, a justification processing unit 122, a PSI inserting unit 125, an OAM processing unit 126, and a multiplexer 132.

The VCAT/LCAS processing unit 116 includes a VCOH inserting unit 117. The justification processing unit 122 includes a JOH inserting unit 123 and an Elastic Store (ES) memory 124. The OAM processing unit 126 includes an STAT inserting unit 127, a TTI inserting unit 128, a BIP4 inserting unit 129, a BDI inserting unit 130, and a BEI inserting unit 131.

The signal loss detection unit 111 receives an input of the OC-3 signal or the OC-12 signal to detect a loss state of the input signal. If the loss state is detected, the signal loss detection unit 111 reports the detection to the gAIS generating unit 118. The signal loss detecting unit 112 receives the input of the client signal other than the OC-3 signal and the OC-12 signal to detect a signal interruption (for example, a link down) of the input signal. If the signal interruption is detected, the signal loss detecting unit 112 reports the detection to the GFP encapsulating unit 113.

The GFP encapsulating unit 113 performs encapsulating processing of GFP (Generic Framing Procedure)-T (Transparent)/F (Framed) specified by ITU-T G.7041 on the client signal. In the signal interruption state, Client Management Frame (CMF) Client Signal Fail (CSF)/Forward Detect Indication (FDI) is inserted. The PRBS 31 generating unit 114 generates a Pseudo Random Binary Sequence (PRBS) 31 as a test signal for the Sub ODU1 line. The selector 115 selects any of the signals input from the signal loss detection unit 111, the GFP encapsulating unit 113, and the PRBS 31 generating unit 114.

The VCAT/LCAS processing unit 116 performs VCAT processing by each of the TSs to map the client signal in the Sub ODU1 by applying the VCAT. Moreover, the VCAT/LCAS processing unit 116 performs the transmission side processing of the LCAS specified by ITU-T G.7042. The VCOH inserting unit 117 generates and inserts the VCOH information of the Sub ODU1.

When the VCAT is applied, the processing from the gAIS generating unit 118 to the BEI inserting unit 131 described below is performed for each of the TSs included in the TS group that maps the client signal.

When receiving the report of the loss state from the signal loss detection unit 111, the gAIS generating unit 118 generates a Generic AIS signal that is specified by ITU-T G.709. The LCK generating unit 119 generates a signal indicating the Sub OUD1-LCK state. The OCI generating unit 120 generates a signal indicating the Sub ODU1-OCI state. The selector 121 selects any of the signals input from the gAIS generating unit 118, the LCK generating unit 119, and the OCI generating unit 120.

The justification processing unit 122 performs processing for absorbing a frequency difference and mapping the Sub ODU1 signal in the OPU1 payload. The JOH inserting unit 123 inserts a JOH into the Sub ODU1 signal. The JOH inserting unit 123 generates the JC bit indicating the insertion state of the JOH. The ES memory 124 is a buffer memory that adjusts a timing of the Sub ODU1 signal. The PSI inserting unit 125 inserts the PSI byte (that is, PT, VcPT, MSI, TsPT, and TsVcPT).

The OAM processing unit 126 inserts PM information of the Sub ODU1. The STAT inserting unit 127 inserts a STAT bit. The TTI inserting unit 128 inserts TTI information. The BIP4 inserting unit 129 inserts a BIP4 bit. The BDI inserting unit 130 inserts a BDI bit. The BEI inserting unit 131 inserts a BEI bit. The multiplexer 132 multiplexes and maps a plurality of Sub ODU1 signals in the OPU1.

Figure 13:
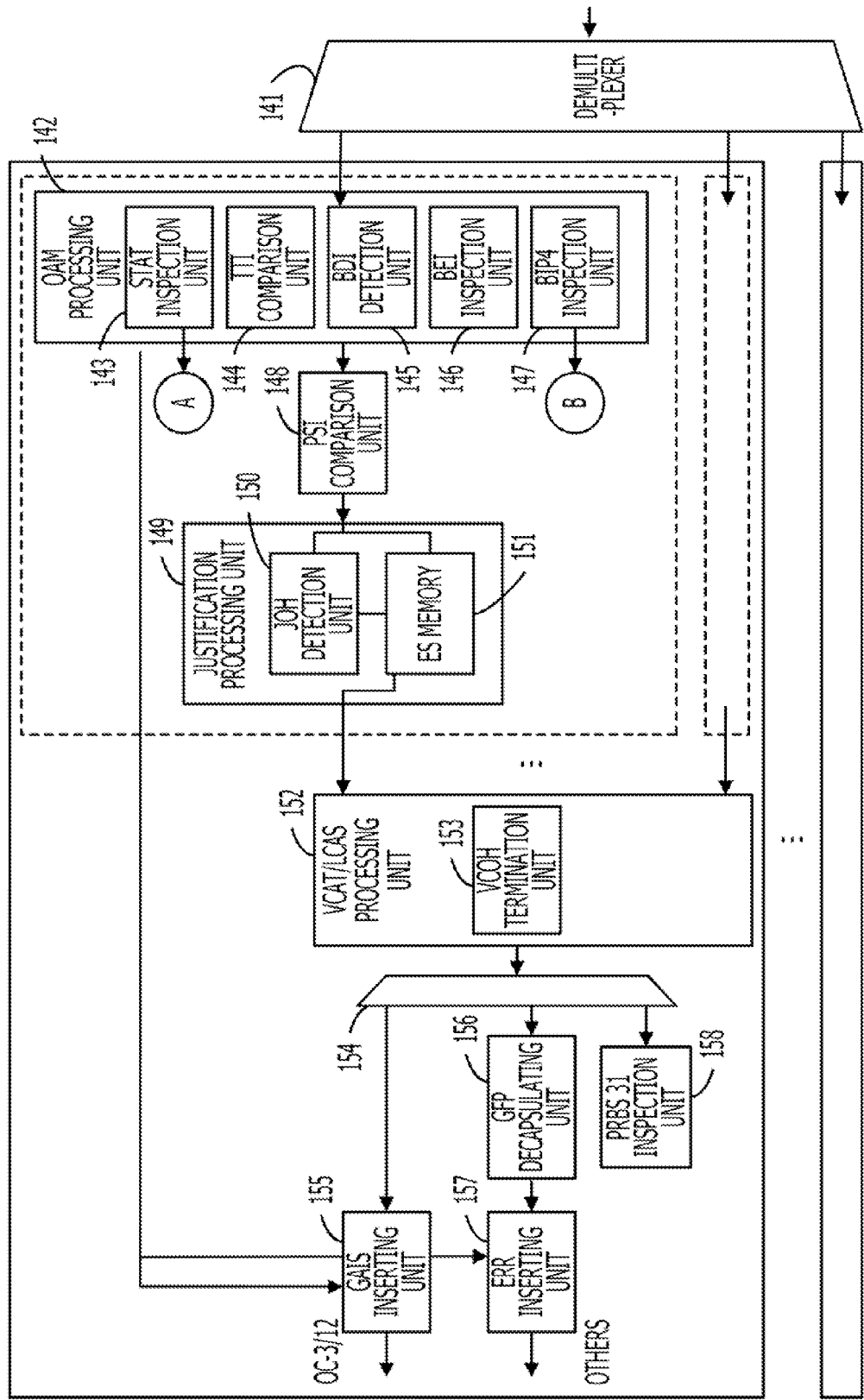
FIG. 13 is a block diagram illustrating a reception side of the optical transmission device.

FIG. 13 is a block diagram illustrating a reception side of the optical transmission device. The optical transmission device 100 includes a demultiplexer 141, an OAM processing unit 142, a PSI comparison unit 148, a justification processing unit 149, a VCAT/LCAS processing unit 152, a switch 154, a gAIS inserting unit 155, a GFP decapsulating unit 156, an ERR inserting unit 157, and a PRBS 31 inspection unit 158.

The OAM processing unit 142 includes a STAT inspection unit 143, a TTI comparison unit 144, a BDI detection unit 145, a BEI inspection unit 146, and a BIP4 inspection unit 147. The justification processing unit 149 includes a JOH detection unit 150 and an ES memory 151. The VCAT/LCAS processing unit 152 includes a VCOH termination unit 153.

The demultiplexer 141 separates the plurality of Sub ODU1 signals stored in the OPU1. The OAM processing unit 142 processes the PM information of the Sub ODU1. Based on the STAT bit, the STAT inspection unit 143 detects the error state of the client signal (LCK, OCI, or AIS). The detected error state is reported to the BDI inserting unit 130 of the transmission side. The TTI comparison unit 144 compares the received TTI information to an expectation value. The BDI detection unit 145 detects BDI bit=1. The BEI inspection unit 146 counts the number of error bits based on the BEI bit. The BIP4 inspection unit 147 calculates a BIP4 based on the received OPU1 signal and compares the BIP4 to the received BIP4 bit. The comparison result is reported to the BEI inserting unit 131 of the transmission side.

The PSI comparison unit 148 compares the received PSI byte (that is, PT, VcPT, MSI, TsPT, and TsVcPT) to the expectation value. The justification processing unit 149 extracts the Sub ODU1 signal from the OPU1 payload. The JOH detection unit 150 detects the PJO and the NJO based on the JC bit and controls an output timing of the signal from the ES memory. The ES memory 151 temporally stores a reception signal.

When the VCAT is applied, the above-described processing from the OAM processing unit 142 to the ES memory 151 is performed for each of the TSs included in the TS group. When the client signal is mapped in the Sub ODU1 by applying the VCAT, the VCAT/LCAS processing unit 152 restores an original client signal from the signal of each of the TSs. Moreover, the VCAT/LCAS processing unit 152 performs the LCAS reception side processing specified by ITU-T G.7042. The VCOH termination unit 153 terminates the VCOH of the Sub ODU1. The switch 154 selects and switches the output destination of the signal processed by the VCAT/LCAS processing unit 152 from the gAIS inserting unit 155, the GFP decapsulating unit 156, and the PRBS 31 inspection unit 158.

In a state where a line fault is occurred (AIS), the gAIS inserting unit 155 inserts a Generics ASI signal into the OC-3 signal or the OC-12 signal detected as a client signal. The GFP decapsulating unit 156 performs decapsulating processing of the GFP-T/F specified by ITU-T G.7041. In the error state, the ERR inserting unit 157 inserts an error code (for example, 10B_ERR, /V/, or the like) according to a type of the client signal other than the OC-3 signal and the OV-12. The PRBS 31 inspection unit 158 performs synchronization between the received PRBS 31 and a signal sequence in a prescribed pattern to detect a bit error of the PRBS 31.

Figure 14:
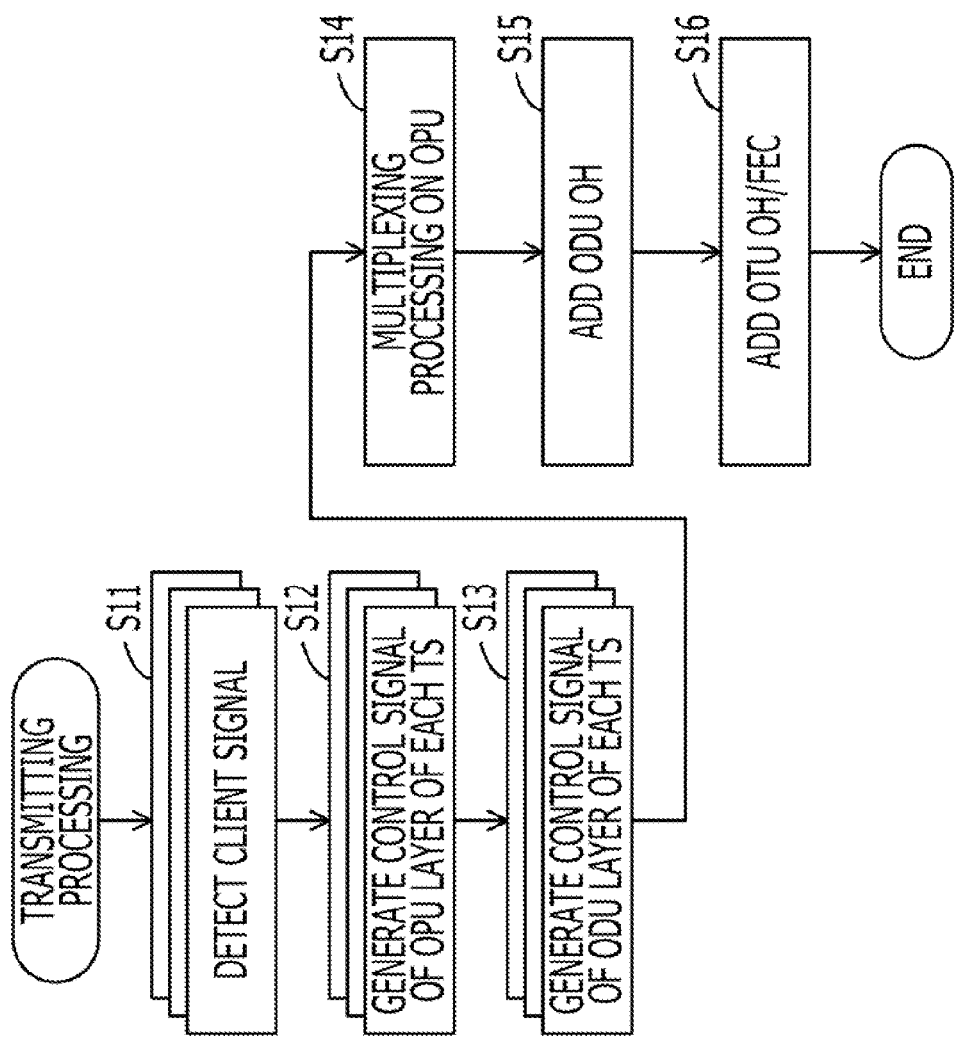
FIG. 14 is a flowchart illustrating a transmitting processing of a frame.

FIG. 14 is a flowchart illustrating transmitting processing of a frame. In this case, the optical transmission device 100 transmits the OTN frame. Similarly, the optical transmission devices 100a, 100b, and 100c transmit the OTN frame.

(Operation S11) The optical transmission device 100 detects a client signal to be stored in the Sub ODU1. (Operation S12) The optical transmission device 100 generates a control signal (for example, a VCOH byte) equivalent to an OPU layer for each of the plurality of Sub ODU1s.

(Operation S13) The optical transmission device 100 generates a control signal (for example, a PM byte) equivalent to an ODU layer for each of the plurality of Sub ODU1s. (Operation S14) The optical transmission device 100 multiplexes and stores the client signal of the plurality of Sub ODU1s in the payload of the OPU1. The control signals generated in Operations S12 and S13 are mapped in the OPU1 overhead.

(Operation S15) The optical transmission device 100 generates the ODU1 by adding the ODU1 overhead to the OPU1. (Operation S16) The optical transmission device 100 generates and transmits the OTU1 by adding the OTU1 overhead and the FEC to the ODU1.

Figure 15:
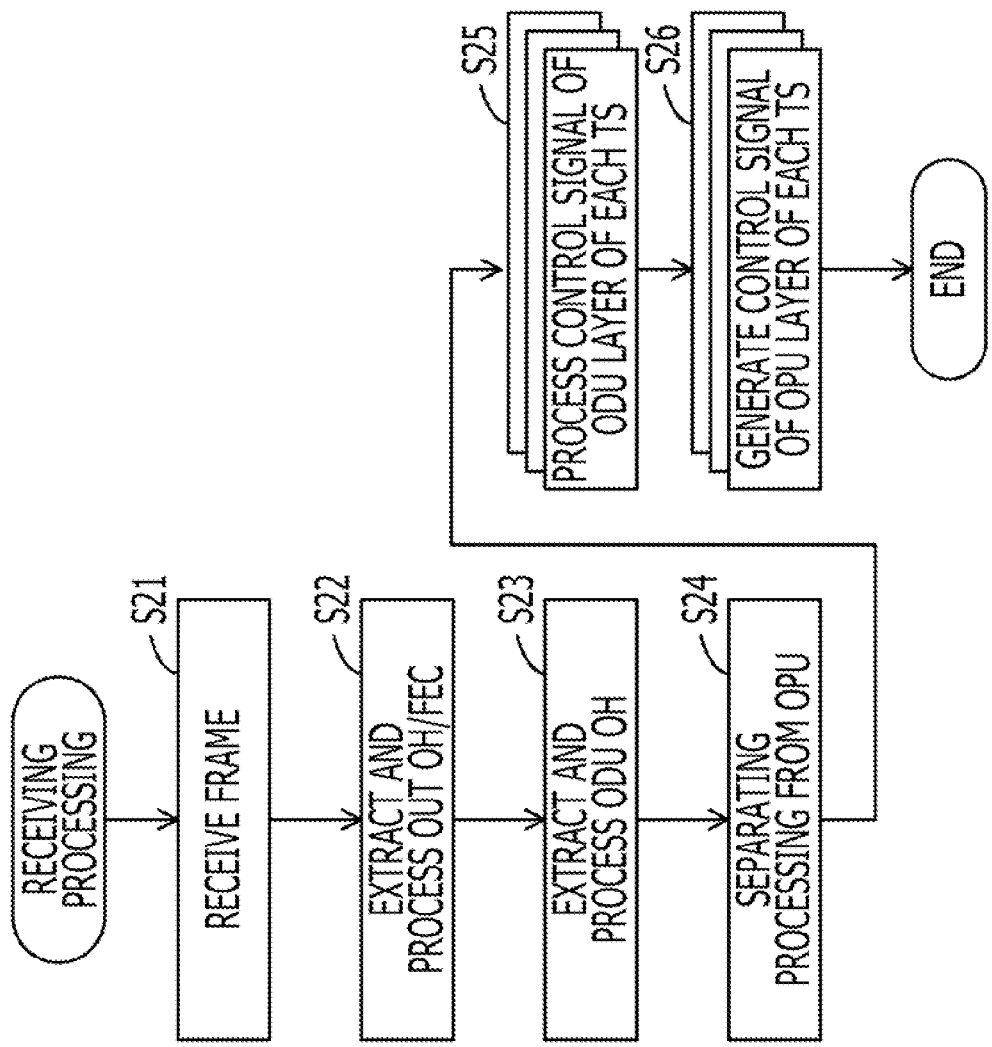
FIG. 15 is a flowchart illustrating a receiving processing of a frame.

FIG. 15 is a flowchart illustrating receiving processing of a frame. In this case, the optical transmission device 100 receives the OTN frame. Similarly, the optical transmission devices 100a, 100b, and 100c receive the OTN frame.

(Operation S21) The optical transmission device 100 receives the OTN frame that stores the plurality of Sub ODU1s. (Operation S22) The optical transmission device 100 extracts the OTU1 overhead and the FEC from the OTU1 and performs processing of the whole OTU1.

(Operation S23) The optical transmission device 100 extracts the ODU1 overhead from the ODU1 and performs the processing of the whole ODU1. (Operation S24) The optical transmission device 100 extracts the client signal of the plurality of Sub ODU1s from the payload of the OPU1. Moreover, the optical transmission device 100 extracts the control signal of the Sub ODU1 from the ODU1 overhead.

(Operation S25) The optical transmission device 100 performs processing by using a control signal (for example, a PM byte) that is equivalent to the ODU layer for each of the plurality of Sub ODU1s. (Operation S26) The optical transmission device 100 performs processing by using the control signal (for example, a control signal) that is equivalent to the OPU layer for each of the plurality of Sub ODU1s.

FIG. 16 is a diagram illustrating a transmission timing of the control bit. As described above, the TTI is transmitted in the 1024-frame cycle, the VCIH and the PSI are transmitted in the 256-frame cycle, and the BIP4, the STAS, the BDI, and the BEI are transmitted in the 16-frame cycle.

For example, regarding the TTI, the SAPI [0] of the TS#1 is transmitted by a frame #0. After that, the SAPI [0] of the TS#2 is transmitted by a frame #1. That is, the SAPI [0] of the TS#1 to #16 is transmitted between the frames #1 to #15. Similarly, the SAPI [1] of the TS#1 to #16 is transmitted between the frames #16 to #31. In this manner, the SAPI of the TS#1 to #16 is transmitted up to a frame #255, so that all of the TTI information is transmitted up to a frame #1023.

Regarding the VCOH, the VCOH [0] of the TS#1 is transmitted by the frame #0. After that, the VCOH [0] of the TS#2 is transmitted by the frame #1. That is, the VCOH [0] of the TS#1 to #16 is transmitted between the frames #0 to #15. Similarly, the VCOH [0] of the TS#1 to #16 is transmitted. In this manner, all of the VCOH information is transmitted up to the frame #255.

On the other hand, the information of the PSI in the order illustrated in FIG. 10 is transmitted. That is, the PT is transmitted by the frame #0, and the VcPT is transmitted by the frame #1. In this manner, all of the PSI information is transmitted up to the frame #255. Regarding the BIP4, the STAT, the BDI, and the BEI, the information of the TS#1 is transmitted by the frame #0, and the information of the TS#2 is transmitted by the frame #1. In this manner, the information of the TS#1 to #16 is transmitted up to the frame #15.

The BIP4 is a parity of 4 bits calculated by applying a prescribed formula to the main signal and is transmitted later than the main signal. A relation between a timing of the main signal and a timing of the BIP4 will be described below.

Figure 17:
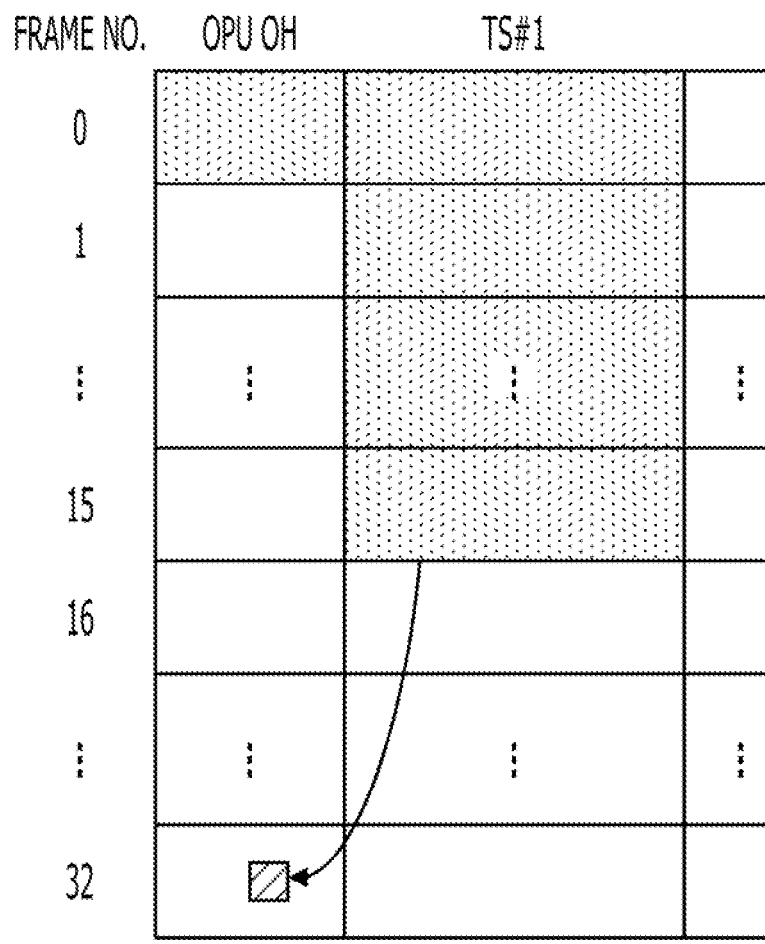
FIG. 17 is a diagram illustrating a calculating method of a BIP4.

FIG. 17 is a diagram illustrating a calculating method of the BIP4. In this case, the BIP4 of the TS#1 is calculated. The transmission side node calculates the BIP4 from the ODU1 overhead of the frame #0 and the payload signal of the TS#1 in 16 successive frames #0 to #15. After that, the transmission side node transmits the calculated BIP4 by the OPU1 overhead of the frame #32.

Regarding other TSs, the BIP4 may be calculated by the similar method. For example, regarding the BIP4 of the TS#2, the BIP4 is calculated from the OPU1 overhead of the frame #1 and the payload signal of the TS#2 in the frames #1 to #17. Consequently, the transmission quality of each of the TSs may be measured by the reception side node. In the example illustrated in FIG. 17, the BIP4 is not transmitted by the frame #32 and may be transmitted by the frame #16.

In the communication system according to the second embodiment, the OTN frame that stores the plurality of Sub ODU1s may be efficiently transmitted. That is, the optical transmission devices 100, 100a, 100b, and 100c may detect the state of each of the Sub ODU1 signals and the transmission quality without directly monitoring the Sub ODU1 signals. As a result, the complexity of the frame processing is reduced, so that the circuit configurations of the optical transmission devices 100, 100a, 100b, and 100c may be simplified.

Since the overhead byte of the Sub ODU1 is mapped in the OPU1 overhead, the band of the payload of the OPU1 may be efficiently used. Moreover, by distributing and mapping the overhead byte of the plurality of Sub ODU1s in a plurality of OPU1 overheads, the above-described mapping may be achieved if an empty area of the OPU1 overhead is used.

At that time, the overhead byte may be transmitted in an appropriate frame cycle according to a property of the overhead byte by varying the number of frames to be multi-framed according to the type of the overhead byte. As a result, transmission control of the Sub ODU1 may be properly performed while reducing the area used for transmission of the overhead byte of the Sub ODU1.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device to transmit a first frame, the communication device comprising:
    a control signal generating unit to generate control signals including a trail trace identifier that is character string information to be reported to a manager's terminal, information used for transmission qualities of a plurality of second frames, and information indicating a state of a client signal, wherein the control signals are used for performing communication control on each of the plurality of second frames; and
    a mapping unit to map a payload signal of the plurality of second frames in a payload area of the first frame, and map the control signals generated by the control signal generating unit in a control signal area of the first frame.

2. The communication device according to claim 1, wherein the control signal area includes a first area used for transmission of the control signal of a first layer and a second area used for the transmission of the control signal of a second layer which is lower than the first layer, and
    wherein the mapping unit maps the control signal of at least one of the plurality of second frames in the first area.

3. The communication device according to claim 1, wherein the payload area is divided into a plurality of time slots, and
    wherein the mapping unit maps at least some of the control signals, which indicate a relation between the plurality of second frames and the plurality of time slots, in the control signal area.

4. A communication device to receive a first frame, the communication device comprising:
    an extraction unit to extract a payload signal of a plurality of second frames multiplexed in a payload area of the first frame and extract control signals of the plurality of second frames included in a control signal area of the first frame,
    a detection unit to detect a trail trace identifier that is character string information to be reported to a manager's terminal, information indicating a state of a client signal, and information used for transmission qualities of the plurality of second frames, included in the control signals, without monitoring the payload signal of the plurality of second frames; and
    a control signal processing unit to perform a communication control of each of the plurality of second frames based on the control signals detected by the detection unit.

5. A communication method to transmit a first frame, the communication method comprising:
    generating control signals including a trail trace identifier that is character string information to be reported to a manager's terminal, information used for transmission qualities of a plurality of second frames, and information indicating a state of a client signal, wherein the control signals are used for performing communication control on each of a plurality of second frames; and
    mapping a payload signal of a plurality of second frames in a payload area of the first frame and also mapping the generated control signals in a control signal area of the first frame.

* * * * *